US009063698B2

(12) United States Patent
Chang et al.

(10) Patent No.: US 9,063,698 B2
(45) Date of Patent: Jun. 23, 2015

(54) PORTABLE ELECTRICAL DEVICE

(71) Applicant: Quanta Computer Inc., Taoyuan (TW)

(72) Inventors: Jung-Wen Chang, Taoyuan County (TW); Cheng-Pu Chu, New Taipei (TW); Huai-Wu Wen, New Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 278 days.

(21) Appl. No.: 13/844,979

(22) Filed: Mar. 17, 2013

(65) Prior Publication Data

US 2014/0063720 A1 Mar. 6, 2014

(30) Foreign Application Priority Data

Aug. 31, 2012 (TW) .............................. 101216818 U

(51) Int. Cl.
*H05K 5/00* (2006.01)
*G06F 1/16* (2006.01)

(52) U.S. Cl.
CPC ............ *G06F 1/1637* (2013.01); *G06F 1/1626* (2013.01); *G06F 1/1632* (2013.01); *G06F 1/1669* (2013.01)

(58) Field of Classification Search
CPC ... F16M 2200/08; F16M 11/00; F16M 11/04; H05K 5/0234; G06F 1/1616; G06F 1/1681; G06F 1/1636
See application file for complete search history.

(56) References Cited

U.S. PATENT DOCUMENTS

| | | | | |
|---|---|---|---|---|
| 5,375,076 A | * | 12/1994 | Goodrich et al. | 361/679.17 |
| 6,971,622 B2 | * | 12/2005 | Ziegler et al. | 248/454 |
| 2005/0052831 A1 | * | 3/2005 | Chen | 361/680 |
| 2006/0108494 A1 | * | 5/2006 | Lancet | 248/456 |
| 2006/0145046 A1 | * | 7/2006 | Liou et al. | 248/455 |
| 2007/0030634 A1 | * | 2/2007 | Maskatia | 361/683 |
| 2008/0101003 A1 | * | 5/2008 | Lin | 361/683 |
| 2009/0040701 A1 | * | 2/2009 | Lin | 361/681 |
| 2010/0072334 A1 | * | 3/2010 | Le Gette et al. | 248/176.3 |
| 2010/0124009 A1 | * | 5/2010 | Jiang et al. | 361/679.27 |
| 2011/0038119 A1 | * | 2/2011 | Yeh | 361/679.27 |
| 2011/0101193 A1 | * | 5/2011 | Ye | 248/397 |
| 2011/0108696 A1 | * | 5/2011 | Ye | 248/371 |
| 2013/0128443 A1 | * | 5/2013 | Tseng et al. | 361/679.12 |
| 2013/0176674 A1 | * | 7/2013 | Brogan et al. | 361/679.27 |
| 2014/0340830 A1 | * | 11/2014 | Wu et al. | 361/679.27 |
| 2015/0002998 A1 | * | 1/2015 | Arima et al. | 361/679.27 |
| 2015/0022961 A1 | * | 1/2015 | Jenkins et al. | 361/679.27 |
| 2015/0043144 A1 | * | 2/2015 | Shen | 361/679.27 |

* cited by examiner

*Primary Examiner* — Robert J Hoffberg
*Assistant Examiner* — Hung Dang
(74) *Attorney, Agent, or Firm* — Rabin & Berdo, P.C.

(57) ABSTRACT

A portable electrical device includes a tablet computer, a base panel, two supporting arms and two connecting members. Two ends of each supporting arm are pivotally disposed at one lateral side of the tablet computer and one lateral side of the base panel. The base panel has two guiding grooves oppositely arranged on one surface thereof. One end of the connecting member is pivoted with the lateral side of the tablet computer, and the other end of the connecting member is limited and slidably disposed in one of the guiding grooves. When the other ends of both the connecting members are at one distal end of the guiding groove, the tablet computer is stacked on the base panel, and a touch-controlled display of the tablet computer can alternatively face towards or opposite to the base panel.

10 Claims, 9 Drawing Sheets

PORTABLE ELECTRICAL DEVICE

RELATED APPLICATIONS

This application claims priority to Taiwan Application Serial Number 101216818, filed Aug. 31, 2012, which is herein incorporated by reference.

BACKGROUND

1. Technical Field

The present disclosure relates to a portable electrical device, and more particularly to a portable electrical device capable of covering and protecting its touch-controlled display.

2. Description of Related Art

A conventional tablet computer features shape of lightness and thinness for easy portability, and a touch-controlled display of the tablet computer for input by touch controlling or handwriting of a user. Moreover, the tablet computer can be additionally provided with, for example, a base panel, such that the tablet computer can inclinedly stand on the base panel for adjusting a satisfied view angle thereof.

However, when the tablet computer is not in use, the tablet computer only can be horizontally disposed on the base panel exposing the touch-controlled display of the tablet computer. With no protection, the touch-controlled display is vulnerable to be damaged as suffering an external impact, which results in inconvenience in operation and reduces the user's willingness to purchase the tablet computer at first place.

Given above, developing a portable electronic device capable of overcoming the mentioned shortcomings to strengthening competitiveness in the market is seriously concerned.

SUMMARY

One aspect of the present disclosure is to provide a portable electronic device, in one of the embodiments, when a tablet computer is stacked on a base panel, a touch-controlled display of the tablet computer can be chosen to be either exposed upwardly or hidden by the tablet computer for protecting the touch-controlled display. Furthermore, when the tablet computer stands on the base panel, an included angle is formed between the tablet computer and the base panel.

One technical solution provided by the present disclosure is to disclose a portable electrical device comprises a tablet computer, a base panel, two supporting arms and two connecting members. The tablet computer is provided with a touch-controlled display. The base panel comprises two guiding grooves oppositely arranged on one surface of the base panel. Each of the guiding grooves is formed with a groove opening which is narrower than the guiding groove. Each of the supporting arms comprises a first end and a second end opposite to each other. The first ends thereof are respectively pivoted at two opposite lateral surfaces of the tablet computer, and the second ends thereof are respectively pivoted at two opposite lateral surfaces of the base panel. Each of the connecting members comprises a third end and a fourth end opposite to each other. The third ends thereof are respectively protruded outwards from the groove opening and pivoted to the opposite lateral surfaces of the tablet computer. The fourth ends thereof are limited and slidably disposed in the guiding grooves, respectively.

Therefore, when the tablet computer is stacked on the surface of the base panel, and when each fourth end of the connecting members is situated at one end of the respective guiding groove, the touch-controlled display is situated on a surface of the tablet computer opposite to the base panel. On the other hand, when the tablet computer is stacked on the surface of the base panel, and when each fourth end of the connecting members is situated at the other end of the respective guiding groove, the touch-controlled display is situated on a surface of the tablet computer facing towards the base panel.

To sum up, when the tablet computer is stacked on the surface of the base panel, and the touch-controlled display faces towards the base panel, the touch-controlled display can be covered and protected between the base panel and the tablet computer so as to keep the touch-controlled display from damage of impact. As a result, the convenience in operation for the portable electronic device is provided, and the user's desire for buying the portable electronic device is also increased.

BRIEF DESCRIPTION OF THE DRAWINGS

The present disclosure will be apparent to those skilled in the art by reading the following detailed description of a preferred embodiment thereof, with reference to the attached drawings, in which.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
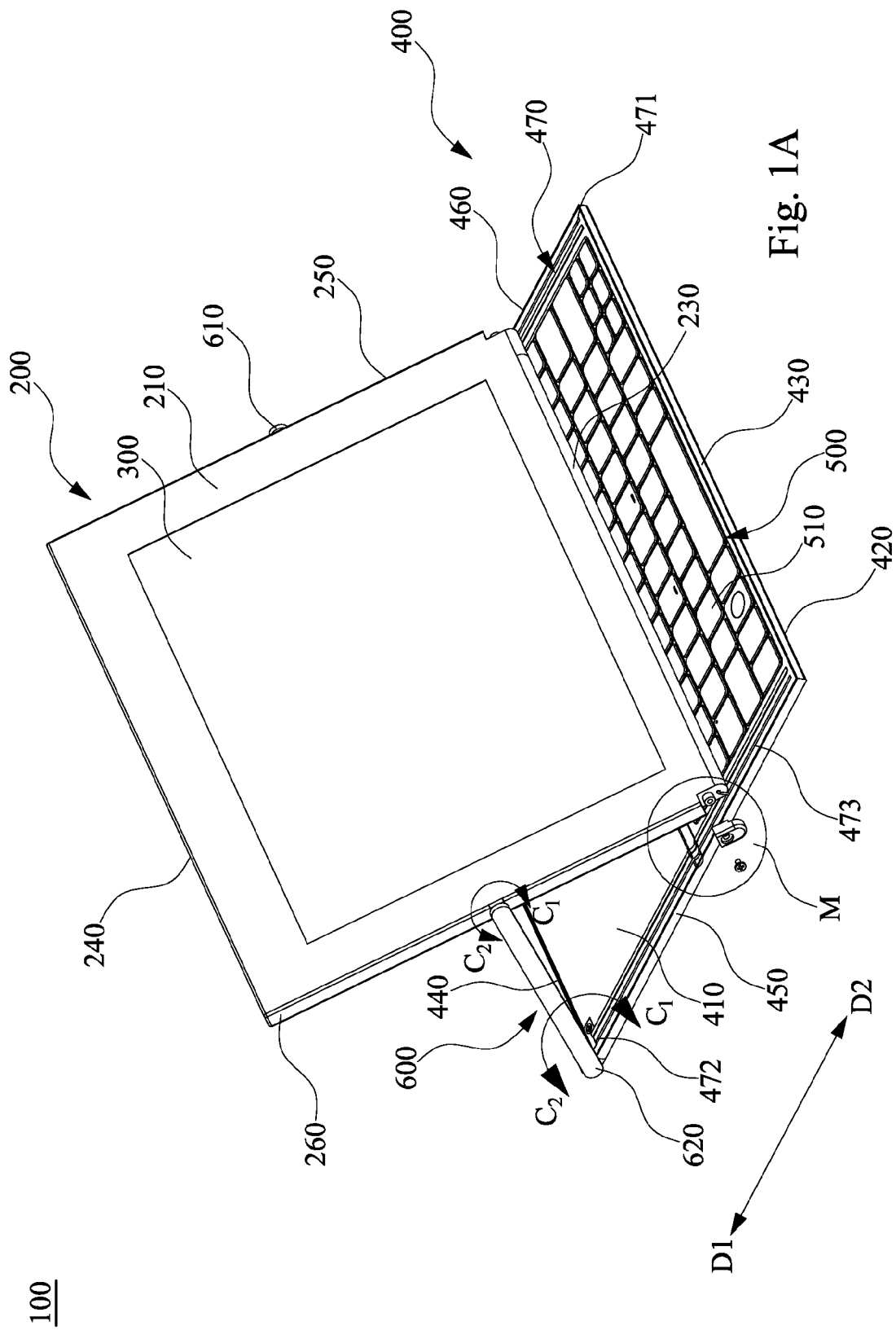
FIG. 1A is a schematic view illustrating the portable electronic device being operated according to an embodiment of the present disclosure.
Figure 1B:
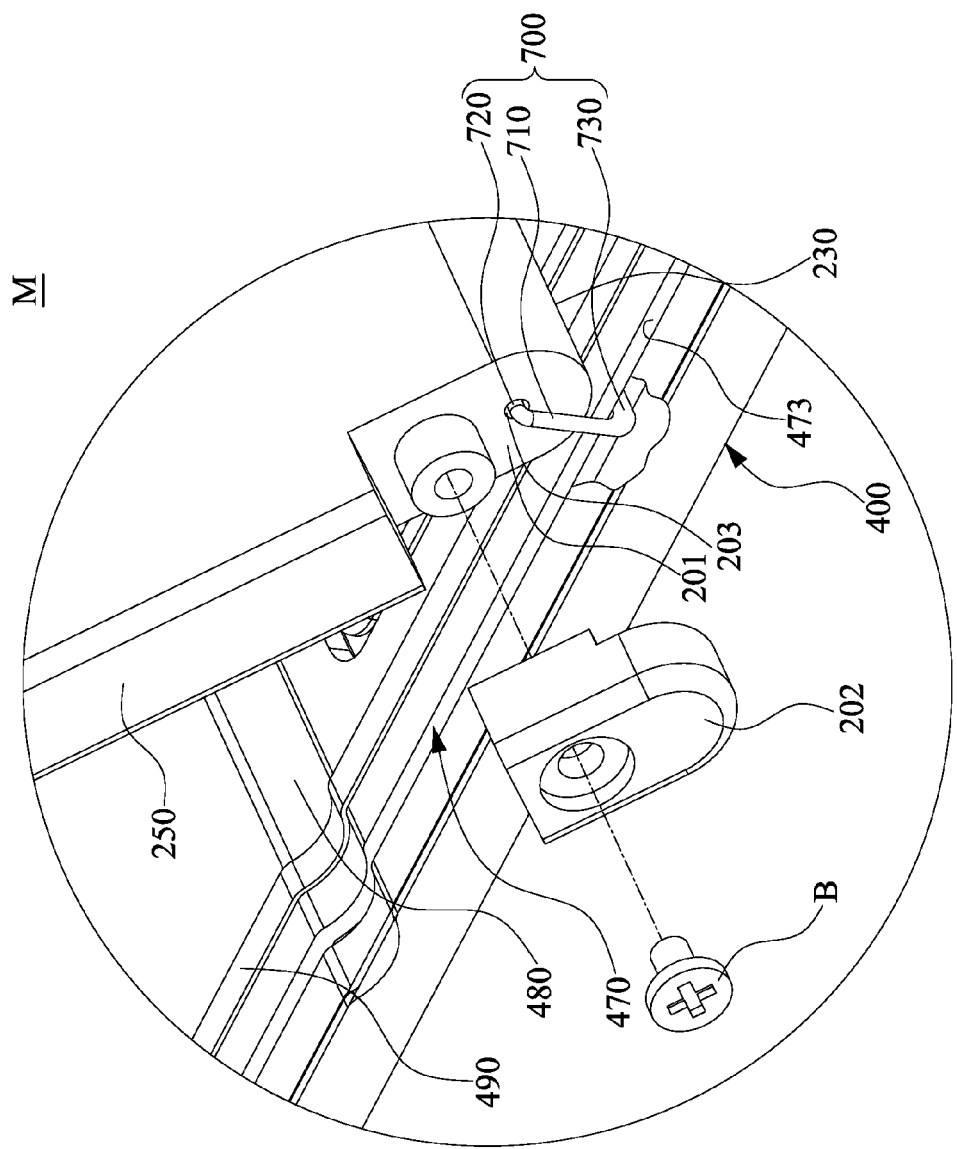
FIG. 1B is a partially enlarged view illustrating an area M of FIG. 1A.

Reference is now made to FIG. 1A and FIG. 1B. FIG. 1A is a schematic view illustrating the portable electronic device 100 being operated according to an embodiment of the present disclosure. FIG. 1B is a partially enlarged view illustrating an area M of FIG. 1A.

In the embodiment of the disclosure, the portable electrical device 100 comprises a tablet computer 200, a base panel 400, two supporting arms 600 and two connecting members 700.

The tablet computer 200 is shaped as a rectangular board having consistent thickness or a wedge board having slightly increasing thickness. The tablet computer 200 is defined with a front main surface 210 and a rear main surface 220 opposite to each other, and four lateral surfaces surrounding the front main surface 210 and the rear main surface 220 in which each lateral surface is smaller than the front main surface 210 or rear main surface 220. A touch-controlled display 300 can be provided on the front main surface 210 of the tablet computer 200. In the embodiment, these lateral surfaces of the tablet computer 200 can be specified as a first long lateral surface 230 and a second long lateral surface 240 which are opposite to each other, and a first short lateral surface 250 and a second short lateral surface 260 opposite to each other. The first short lateral surface 250 and the second short lateral surface 260 are respectively adjacently connected between the first long lateral surface 230 and the second long lateral surface 240.

For example, the tablet computer 200 contains a motherboard, a central process unit, a memory unit, a touch display panel (as aforementioned touch-controlled display 300), a hard disk, a battery unit and other essential electronic components enabling the tablet computer to work, however, the disclosure is not limited to those components only.

The base panel 400, for example is shaped as a rectangular board having consistent thickness or a wedge board having slightly increasing thickness. The base panel 400 is defined with a front main surface 410 and a rear main surface 420 opposite to each other, and four lateral surfaces surrounding the front main surface 410 and the rear main surface 420 in which each lateral surface is smaller than the front main surface 410 or rear main surface 420. The front main surface 410 of the base panel 400 is used for supporting the tablet computer 200, and is provided with an input interface element 500 (e.g., a keyboard 510, a touch-controlled display, a touch-controlled pad or a drag pad) and two guiding grooves 470 on the front main surface 410 thereon. The input interface element 500 is interposed between the guiding grooves 470. In this embodiment, the input interface element 500 is a keyboard 510, comparing to the touch-controlled display, touch-controlled pad or drag pad, users can get a feedback from the keyboard 510 when one key of the keyboard 510 is pressed, thus, allowing to improve the convenience of input.

In the embodiment, these lateral surfaces of the base panel 400 can be specified as a third long lateral surface 430 and a fourth long lateral surface 440 which are opposite to each other, and a third short lateral surface 450 and a fourth short lateral surface 460 opposite to each other. The third short lateral surface 450 and the fourth short lateral surface 460 are respectively adjacently connected between the third long lateral surface 430 and the fourth long lateral surface 440.

The input interface element 500 (e.g., keyboard 510) is disposed on the front main surface 410 of the base panel 400 proximate to the third long lateral surface 430 of the base panel 400. The two guiding grooves 470 are shown in straight shape, oppositely formed on the front main surface 410 of the base panel 400 to be arranged at two opposite sides of the keyboard 510.

Each of the guiding grooves 470 is extended along a direction from the third long lateral surface 430 to the fourth long lateral surface 440 of the base panel 400, and each of the guiding grooves 470 is in parallel to a longer axis of the third long lateral surface 430 or the fourth long lateral surface 440. Each of the guiding grooves 470 is provided with a first distal end 471 and a second distal end 472 which are opposite to each other. The first distal end 471 is proximate to the third long lateral surface 430 of the base panel 400. The second distal end 472 is proximate to the fourth long lateral surface 440 of the base panel 400. Moreover, the guiding groove 470 is formed with a groove opening 473 on the front main surface 410 of the base panel 400, and the groove opening 473 is narrower than the guiding groove 470.

Each of the supporting arms 600, such as a connecting rod, is defined with a first end 610 and a second end 620 opposite to each other. The first ends 610 thereof are respectively pivoted at the first short lateral surface 250 and the second short lateral surface 260 of the tablet computer 200. For example, the first ends 610 thereof are respectively pivoted at an imaginary central point defined between the first long lateral surface 230 and the second long lateral surface 240 of the tablet computer 200. The second ends 620 of the supporting arms 600 are respectively pivoted at the third short lateral surfaces 450 proximate to the ends of the fourth long lateral surface 440 of the base panel 400.

Each of the connecting members 700, for example shown as a U-shaped ring, is defined with a third distal end and a fourth distal end which are opposite with each other. The fourth distal end of each connecting member 700 is received in the corresponding guiding groove 470, and is limited and slidably disposed in the guiding groove 470, and the third distal end of each connecting member 700 is protruded outwards from the groove opening 473 of the guiding groove 470, and is received and pivoted in the first short lateral surface 250 or second short lateral surface 260 of the tablet computer 200.

Substantially, each of the connecting members 700 comprises a rod unit 710, an upper transversal shaft 720 and a lower transversal shaft 730. The upper transversal shaft 720 and the lower transversal shaft 730 as the third distal end and the fourth distal end of the connecting members 700 are respectively disposed at two opposite ends of the rod unit 710, and both are protruded towards the same direction from the rod unit 710. The upper transversal shafts 720 are respectively received in the first short lateral surface 250 and the second short lateral surface 260 of the tablet computer 200, and are pivoted at the first short lateral surface 250 and the second short lateral surface 260 of the tablet computer 200 such that the connecting members 700 can be rotated relative to the tablet computer 200. The lower transversal shaft 730 is limited in the corresponding guiding groove 740, such that the connecting members 700 can only reciprocally slide between the first long lateral surface 230 and a second long lateral surface 240 of the base panel 400. The rod unit 710 is protruded from the guiding groove 470 via the groove opening 473, and also can reciprocally slide along the groove opening 473 of the guiding groove 470 between the first long lateral surface 230 and a second long lateral surface 240 of the base panel 400. Each of the connecting members 700 is formed in U-shaped, I-shaped or J-shaped, and is made of a metal or plastic material for example, but the scope of the present disclosure is not limited to thereto.

Figure 2:
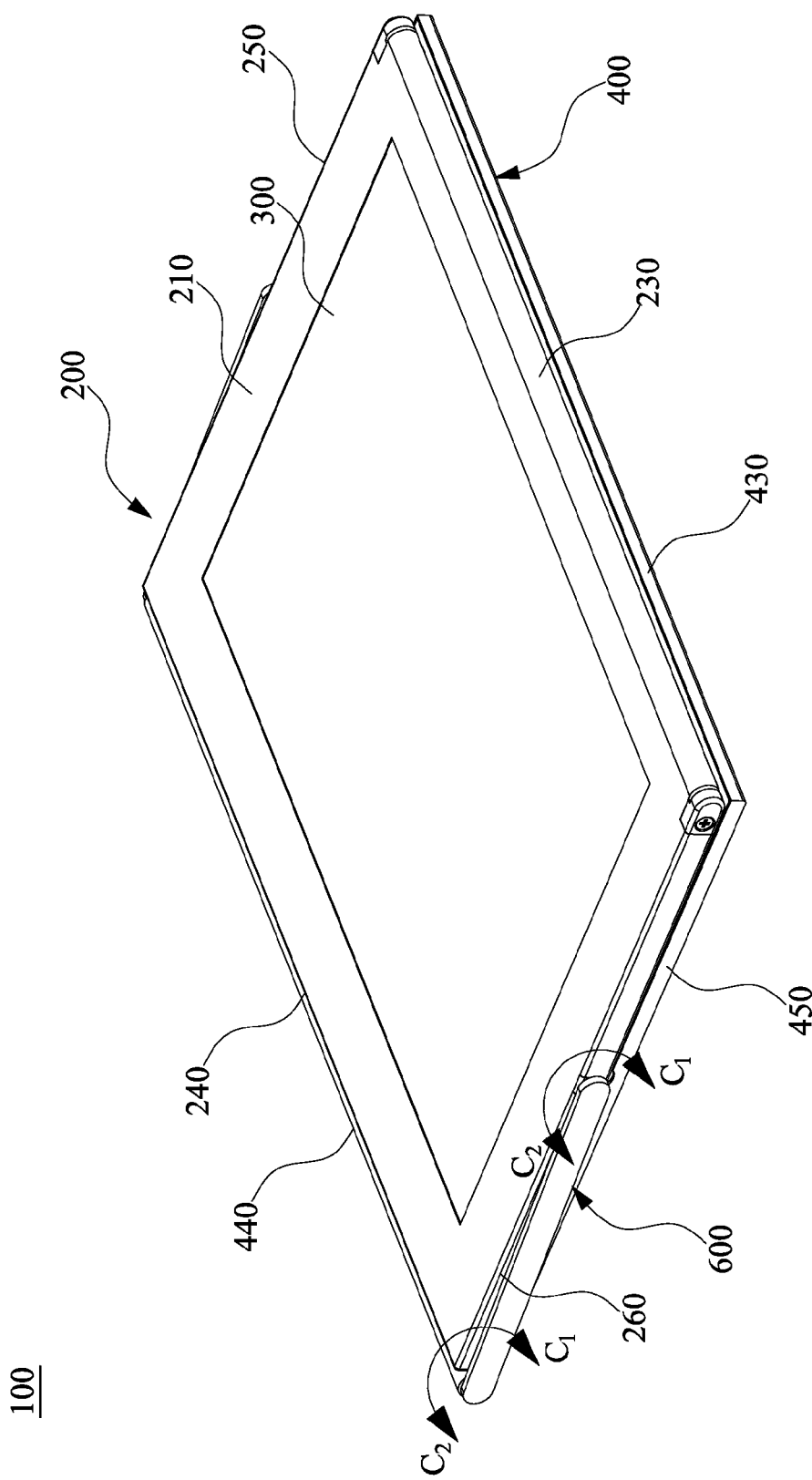
FIG. 2 is a schematic view illustrating the portable electronic device being in a first stacked state, according to the present disclosure.

Reference is now made to FIG. 1A and FIG. 2. FIG. 2 is a schematic view illustrating the portable electronic device 100 being in a first stacked state, according to the present disclosure.

Refer to FIG. 1A, when an external force from a user is exerted on the supporting arms 600, the supporting arms 600 are rotated along a first clockwise direction C1 relative to the base panel 400, the tablet computer 200 are rotated along a second clockwise direction C2 relative to the supporting arms 600, thus, the tablet computer 200 drags both of the lower transversal shafts 730 (FIG. 1B) of the connecting members 700 to slide to the first distal ends 471 of the guiding grooves 470 along a direction D2. After that, the first short lateral surface 250 and the second short lateral surface 260 of the tablet computer 200 are aligned to the supporting arms 600, respectively, so as to further have the tablet computer 200 stacked on the base panel 400. That is, the rear main surface 220 of the tablet computer 200 directly covers on the front main surface 410 of the base panel 400, thus, the touch-controlled display 300 provided on the front main surface 210 of the tablet computer 200 is exposed thereon, thus, a first stacked state for the portable electronic device 100 is defined (FIG. 2).

Figure 3:
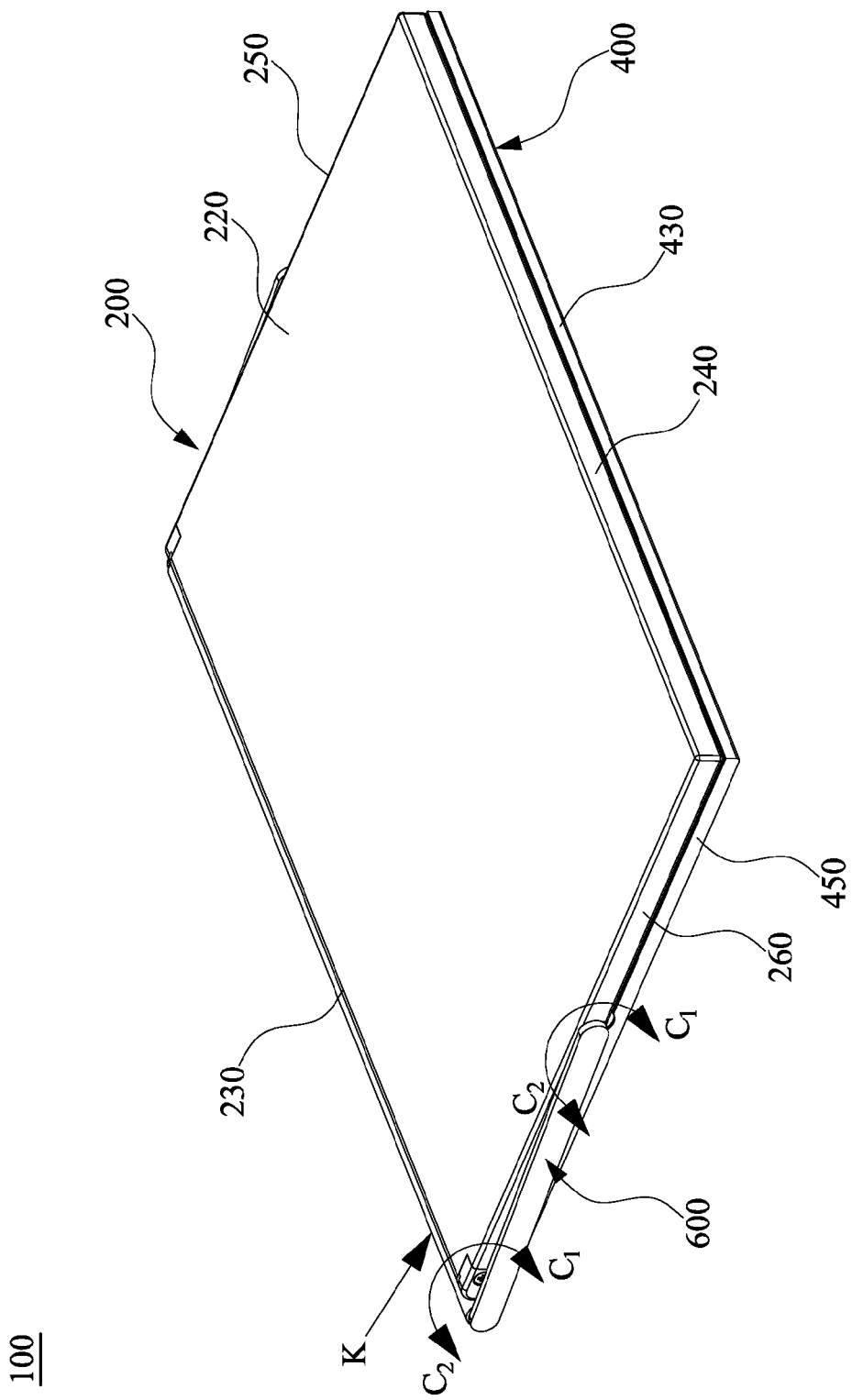
FIG. 3 is a schematic view illustrating the portable electronic device being in a second stacked state, according to the present disclosure.

Reference is now made to FIG. 1A and FIG. 3. FIG. 3 is a schematic view illustrating the portable electronic device 100 being in a second stacked state, according to the present disclosure.

Figure 4:
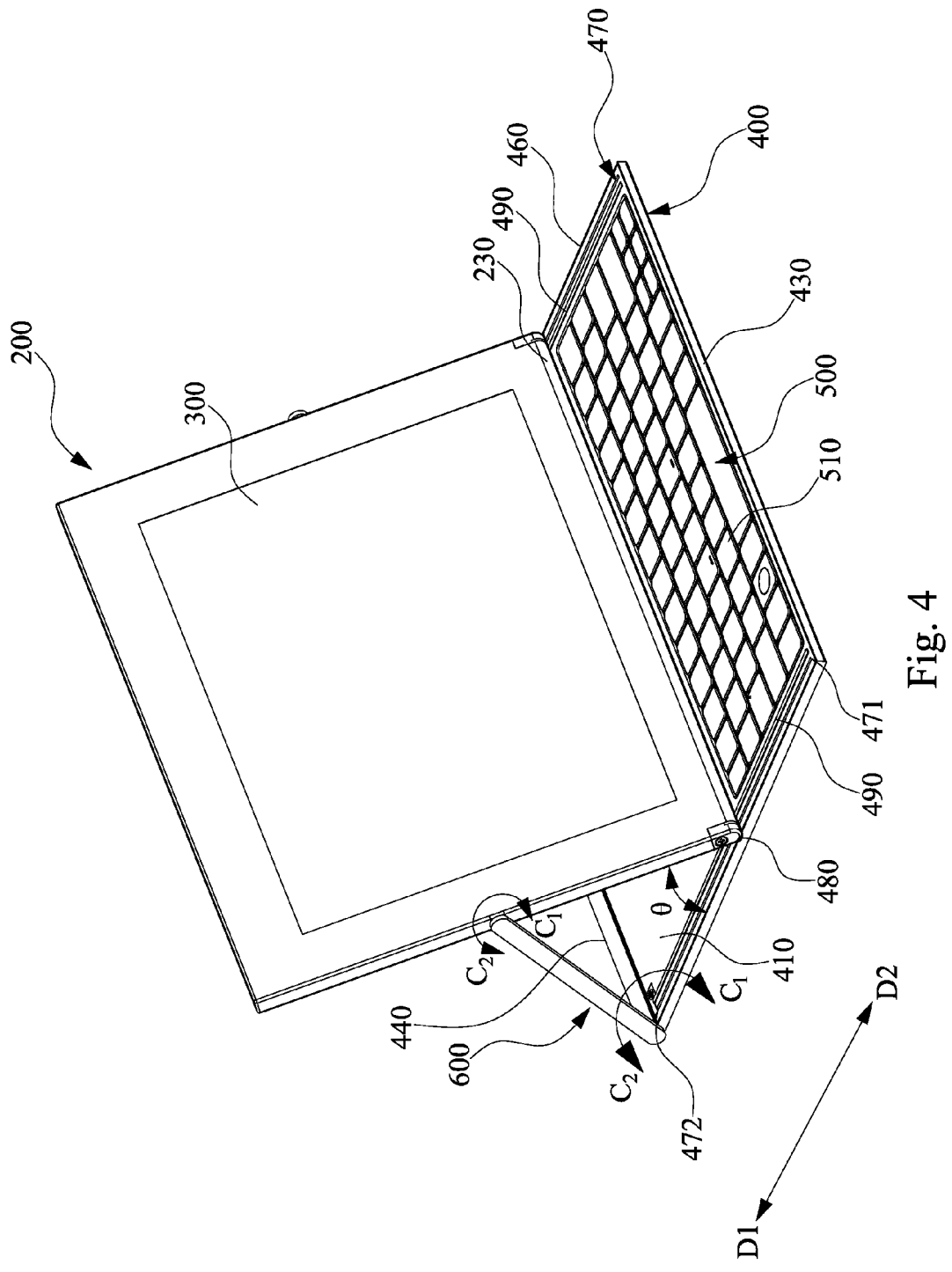
FIG. 4 is a schematic view illustrating the portable electronic device being in a standing state, according to the present disclosure.

Refer to FIG. 1A, when an external force from a user is exerted on the supporting arms 600, the supporting arms 600 are rotated along the second clockwise direction C2 relative to the base panel 400, the tablet computer 200 are rotated along the first clockwise direction C1 relative to the supporting arms 600, thus, the tablet computer 200 drags both of the lower transversal shafts 730 (FIG. 1B) of the connecting members 700 to slide to the second distal ends 472 of the guiding grooves 470 along a direction D1. After that, the first short lateral surface 250 and the second short lateral surface 260 of the tablet computer 200 are aligned to the supporting arms 600, respectively, so as to further have the tablet computer 200 stacked on the base panel 400. That is, the front main surface 210 of the tablet computer 200 directly covers on the front main surface 410 of the base panel 400, thus, the touch-controlled display 300 (FIG. 1A) provided on the front main surface 210 of the tablet computer 200 is hidden between the base panel 400 and the tablet computer 200, thus, a second stacked state for the portable electronic device 100 is defined (FIG. 3). Reference is now made to FIG. 1A and FIG. 4. FIG. 4 is a schematic view illustrating the portable electronic device 100 being in a standing state, according to the present disclosure.

The base panel 400 further comprises at least one position limiting groove 480. The position limiting groove 480 is transversally disposed on the front main surface 410 of the base panel 400, and disposed at one side of the input interface element 500 (i.e., keyboard 510) which is distal from the third lateral surface 430 of the base panel 400. The base panel 400 also is situated between the input interface element 500 (i.e., keyboard 510) and the fourth lateral surface 440 of the base panel 400. The position limiting groove 480 is extended along a direction in parallel with a longer axis of the fourth lateral surface 440 of the base panel 400, in other word, the input interface element 500 (i.e., keyboard 510) is situated between the position limiting groove 480 and the third lateral surface 430 of the base panel 400.

Thus, refer to FIG. 1A, when an external force from a user is exerted on the supporting arms 600, the supporting arms 600 are rotated along the second clockwise direction C2 relative to the base panel 400, the tablet computer 200 are rotated along the first clockwise direction C1 relative to the supporting arms 600, thus, the first long lateral surface 230 of the tablet computer 200 can move into the position limiting groove 480 along the direction D1. After that, the first long lateral surface 230 of the tablet computer 200 would not be easy to move towards the fourth lateral surface 440 of the base panel 400. At this moment, the tablet computer 200 drags both of the lower transversal shafts 730 (FIG. 1B) of the connecting members 700 to slide between the first distal ends 471 and the second distal ends 472 of the guiding grooves 470 along the direction D1, thus, the tablet computer 200 stands on the front main surface 410 of the base panel 400, and forms an included angle θ between the tablet computer 200 and the base panel 400. Therefore, users can input text or instructions by the input interface element 500 (i.e., keyboard 510), and, thus, a standing state for the portable electronic device 100 is defined (FIG. 4).

Furthermore, when multiple position limiting grooves 480 are existed on the base panel 400, the position limiting grooves 480 are arranged on the front main surface 410 in parallel with each other, and disposed between the keyboard 510 and the fourth lateral surface 440 of the base panel 400. The personnel thereof can organize these position limiting grooves 480 in appropriate locations according to a required view angle of the touch-controlled display 300 of users.

Moreover, refer to FIG. 1B and FIG. 4, the base panel 400 further comprises two prominent strips 490. The prominent strips 490 are shown in straight shape, oppositely formed on the front main surface 410 of the base pane 400 to be arranged respectively at two opposite sides of the input interface element 500 (e.g., keyboard 510).

Each of the prominent strips 490 is extended along a direction from the third long lateral surface 430 to the fourth long lateral surface 440 of the base panel 400, and is in parallel to a longer axis of the third long lateral surface 430 or the fourth long lateral surface 440.

Thus, when the portable electronic device 100 is operated into the standing state from the first stacked state or the second stacked state so that when the tablet computer 200 is slid on the front main surface 410 of the base pane 400, the first long lateral surface 230 of the tablet computer 200 physically contacts with both of the prominent strips 490 and can slide on both of the prominent strips 490. Therefore, since the height of each prominent strip 490 on the front main surface 410 of the base pane 400 is greater than the height of the input interface element 500 (e.g., keyboard 510) on the front main surface 410 of the base pane 400, so that the first long lateral surface 230 of the tablet computer 200 retains a gap with the input interface element 500 (e.g., keyboard 510) to prevent from causing damage on the surface of the input interface element 500 (e.g., keyboard 510) when the tablet computer 200 is slid on the base pane 400.

Figure 5:
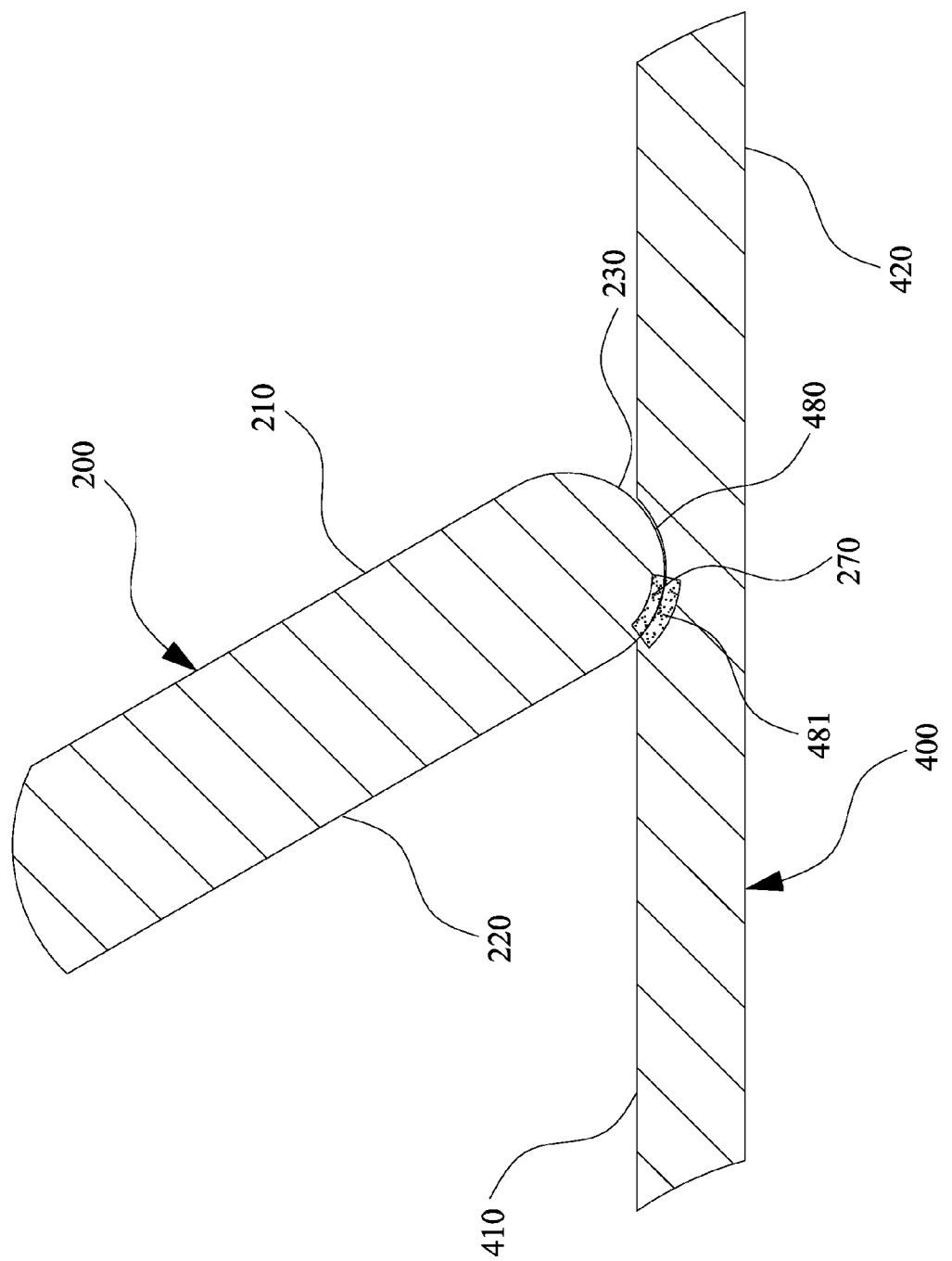
FIG. 5 is a partial lateral view illustrating the portable electronic device being in the standing state, according to one embodiment of the present disclosure.

Reference is now made to FIG. 4 and FIG. 5. FIG. 5 is a partial lateral view illustrating the portable electronic device 100 being in the standing state, according to one embodiment of the present disclosure.

The tablet computer 200 further is provided with one or more first magnetic attracting units 270. The first magnetic attracting unit 270 is disposed on the rear main surface 220 of the tablet computer 200 and is proximate to the first long lateral surface 230, or the first magnetic attracting unit 270 is disposed on the first long lateral surface 230. Specifically, the first magnetic attracting unit 270 can be arranged inside the tablet computer 200, and proximate to the rear main surface 220 or the first long lateral surface 230. The base panel 400 further comprises at least one second magnetic attracting unit 480. The second magnetic attracting unit 480 is disposed in the position limiting groove 480, and aligned to the first magnetic attracting unit 270. Specifically, the second magnetic attracting unit 480 can be arranged inside the base panel 400, and proximate to the inner surface of the position limiting groove 480.

Thus, when the portable electronic device 100 is operated into the standing state from the first stacked state or the second stacked state so that the first long lateral surface 230 of the tablet computer 200 stays in the position limiting groove 480 of the base panel 400, because the first magnetic attracting unit 270 and the second magnetic attracting unit 480 are mutually magnetically attracted with each other, the tablet computer 200 is fixed in the position limiting groove 480 of the base panel 400. Therefore, the tablet computer 200 fixedly stands on the front main surface 410 of the base pane 400.

It is noted that the quantity of the first magnetic attracting unit 270 is the same as the quantity of the second magnetic attracting unit 481. The first magnetic attracting unit 270 and the second magnetic attracting unit 481 can be a combination of metal and magnet; or both can be magnets. The so-called magnet also can be an electromagnet, and the magnetic force of the electromagnet can be turned on or off, so that the portable electronic device 100 can be slid over the position limiting groove 480 for entering the second stacked state.

Figure 6:
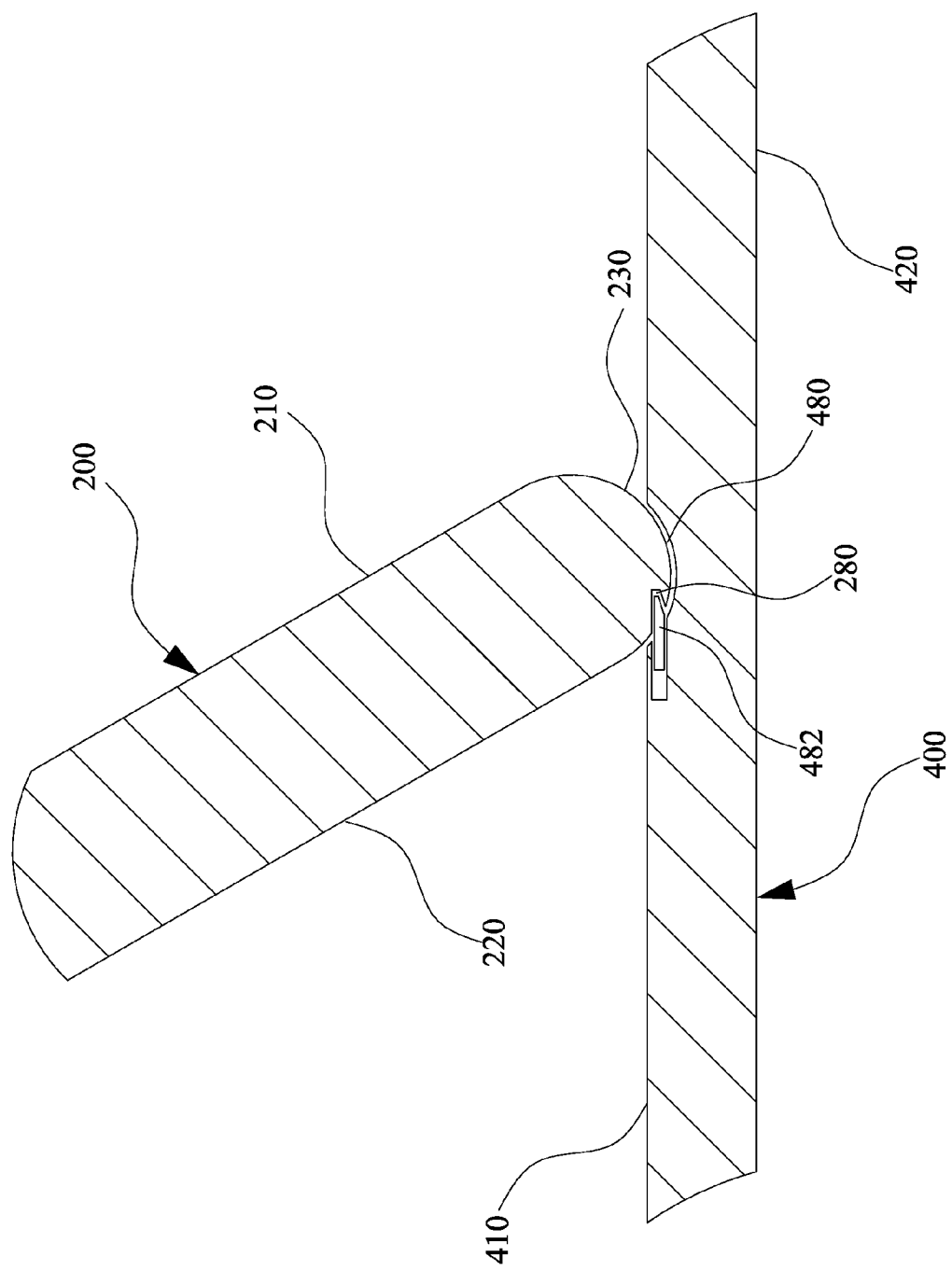
FIG. 6 is a partial lateral view illustrating the portable electronic device being in the standing state, according to another embodiment of the present disclosure.

Also, reference is now made to FIG. 4 and FIG. 6. FIG. 6 is a partial lateral view illustrating the portable electronic device 100 being in the standing state, according to another embodiment of the present disclosure. The tablet computer 200 further comprises one or more latch grooves 280.

The latch groove 280 is formed on the rear main surface 220 of the tablet computer 200 and is proximate to the first long lateral surface 230, or the latch groove 280 is formed on the first long lateral surface 230. The base panel 400 further comprises one or more convex teeth 482. The convex tooth 482 is retractably formed in the position limiting groove 480 (shown as FIG. 6) or at an upper edge of the position limiting groove 480. Also, the quantity of the convex tooth 482 is the same as the quantity of the latch groove 280.

Thus, when the portable electronic device 100 is operated into the standing state from the first stacked state or the second stacked state so that the first long lateral surface 230 of the tablet computer 200 stays in the position limiting groove 480 of the base panel 400, because the convex tooth 482 is aligned with the latch groove 280, the convex tooth 482 can be protruded to latch in the latch groove 280, thus, the tablet computer 200 is fixed in the position limiting groove 480 of the base panel 400. Therefore, the tablet computer 200 fixedly stands on the front main surface 410 of the base pane 400, and the portable electronic device 100 will not be further slid towards the fourth long lateral surface 440 of the base panel 400 over the position limiting groove 480. On the other hand, the convex tooth 482 can be retracted so that the portable electronic device 100 can be slid over the position limiting groove 480 for entering the second stacked state.

Figure 7:
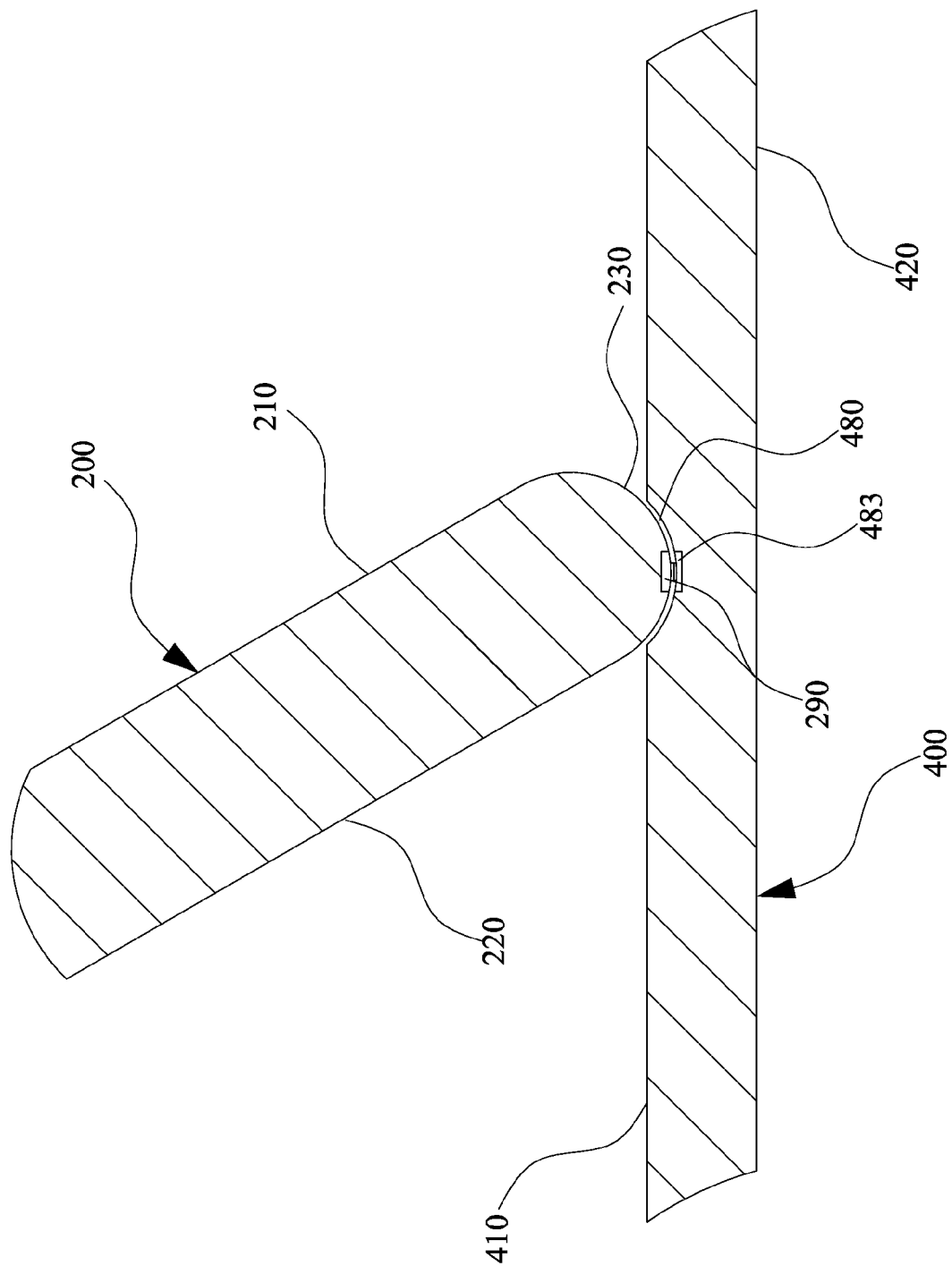
FIG. 7 is a partial lateral view illustrating the portable electronic device being in the standing state, according to the other embodiment of the present disclosure.

Furthermore, Reference is now made to FIG. 4 and FIG. 7. FIG. 7 is a partial lateral view illustrating the portable electronic device 100 being in the standing state, according to the other embodiment of the present disclosure.

The tablet computer 200 further comprises one or more first electrical connectors 290 (such as a probe type connector, a pogo pin or a USB connector). The first electrical connector 290 is disposed on the rear main surface 220 of the tablet computer 200 and is proximate to the first long lateral surface 230, or the first electrical connector 290 is disposed on the first long lateral surface 230.

The base panel 400 further comprises one or more second electrical connectors 483 (such as a probe type connector, a pogo pin or a USB connector). The second electrical connector 483 is disposed in the inner surface of position limiting groove 480 (shown as FIG. 7) or at an upper edge of the position limiting groove 480.

Thus, when the portable electronic device 100 is operated into the standing state from the first stacked state or the second stacked state so that the first long lateral surface 230 of the tablet computer 200 stays in the position limiting groove 480 of the base panel 400, the first electrical connector 290 is connected with the second electrical connector. Thus, signals can be transferred between the tablet computer 200 and the input interface element 500 (i.e., keyboard 510) of the base panel 400.

However, the present disclosure is not limited to the above disclosure, a signal cable (not shown in figures) of the base panel 400 can be connected to the tablet computer 200 along one of the supporting arms 600, or the tablet computer 200 and the input interface element 500 (i.e., keyboard 510) of the base panel 400 can be wirelessly electrically connected with each other, for example, through Bluetooth protocol.

Refer to FIG. 1B, the tablet computer 200 further comprises two recesses 201, two first covers 202 and two shaft holes 203. The recesses 201, the first covers 202 and the shaft holes 203 are respectively formed on the first short lateral surface 250 and the second short lateral surface 260 proximate to the first long lateral surface 230. The shaft holes 203 are respectively located at the recesses 201, and the first covers 202 can be detachably disposed on the recesses 201, respectively.

Figure 8:
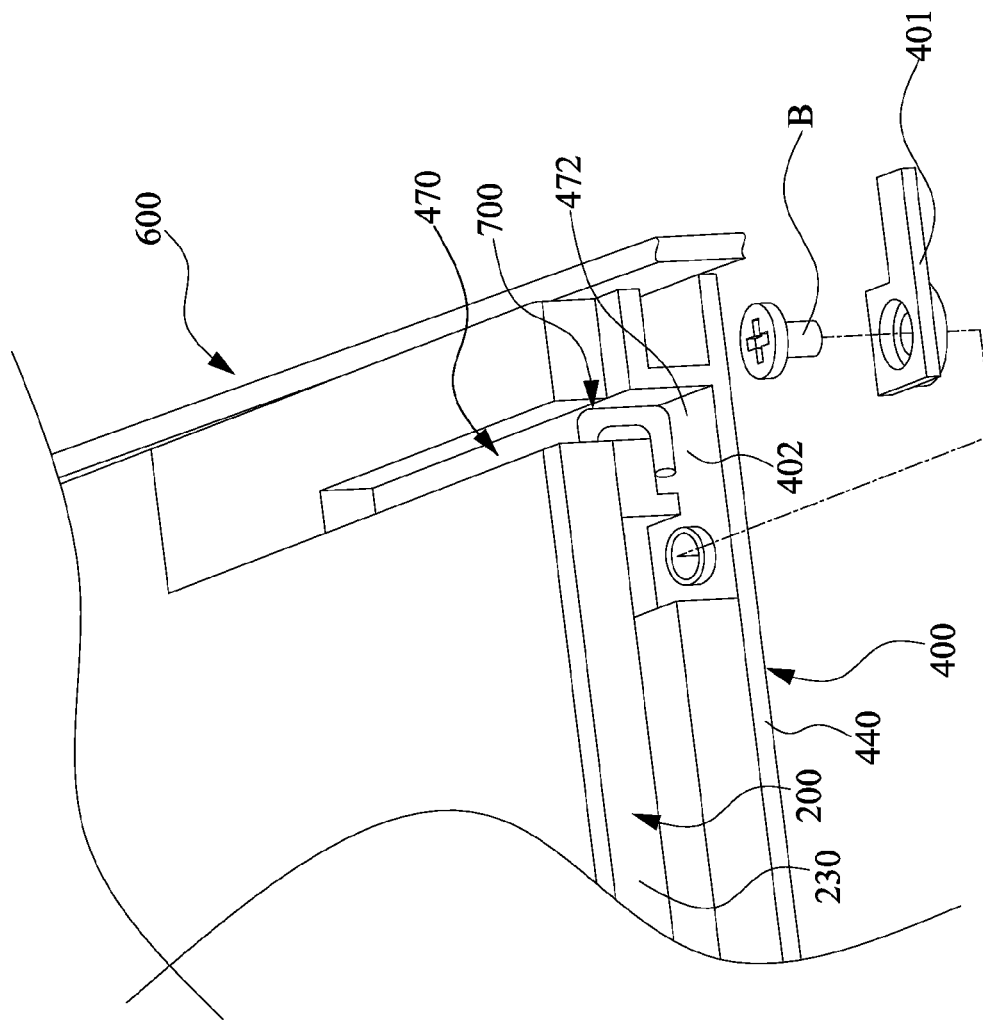
FIG. 8 is a partially enlarged view illustrating the portable electronic device of FIG. 3 viewed from a direction K.

FIG. 8 is a partially enlarged view illustrating the portable electronic device 100 of FIG. 3 viewed from a direction K.

The base panel 400 further comprises two second covers 401 and two notches 402. The second covers 401 and the notches 402 are respectively formed on two ends of the fourth long lateral surface 440 of the base panel 400 aligned to the guiding grooves 470 respectively. Each of the notches 402 is in communication with the second distal end 472 of the guiding groove 470. The second covers 401 can be detachably disposed on the notches 402, respectively.

Thus, in steps of the connecting members 700 being assembled on the tablet computer 200 and the guiding grooves 470, first, refer to FIG. 1B, (1) the first covers 202 are removed for exposing the recesses 201, and the second covers 401 are removed for exposing the notches 402; next, (2) the upper transversal shafts 720 of the connecting members 700 are respectively inserted into the shaft holes 203 so that the upper transversal shafts 720 of the connecting members 700 are respectively pivoted on the tablet computer 200; next, refer to FIG. 8, (3) the lower transversal shafts 730 of the connecting members 700 are respectively moved into the second distal end 472 of the guiding groove 470 via the notches 402 so that the lower transversal shafts 730 of the connecting members 700 can be slidably disposed in the guiding grooves 470, respectively; finally, refer to FIG. 1B, (4) the first covers 202 are respectively assembled back to the first short lateral surface 250 and the second short lateral surface 260 by screws B for covering the recesses 201 so that the upper transversal shafts 720 of the connecting members 700 can not removed from the shaft holes 203, and refer to FIG. 8, the second covers 401 are respectively assembled back to the base panel 400 by screws B for covering the notches 402 so that the lower transversal shafts 730 of the connecting members 700 can not removed from the notches 402 on the fourth long lateral surface 440 of the base panel 400.

To sum up, when the tablet computer is stacked on the surface of the base panel, and the touch-controlled display faces towards the base panel, the touch-controlled display can be covered and protected between the base panel and the tablet computer so as to reduce the possibility that the touch-controlled display is impacted to be damaged. Thus, the convenience of operating the portable electronic device can be provided, and the user's willingness for purchasing and operating the portable electronic device also can be increased.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A portable electrical device comprising:
   a tablet computer provided with a touch-controlled display;
   a base panel comprising two guiding grooves oppositely arranged on one surface of the base panel, wherein each of the guiding grooves is formed with a groove opening which is narrower than the guiding groove;
   two supporting arms, each of the supporting arms comprising a first end and a second end opposite to each other, the first ends thereof respectively pivoted at two opposite lateral surfaces of the tablet computer, and the second ends thereof respectively pivoted at two opposite lateral surfaces of the base panel; and
   two connecting members, each of the connecting members comprising a third end and a fourth end opposite to each other, the third ends thereof respectively protruded outwards from the groove opening and pivoted to the opposite lateral surfaces of the tablet computer, and the fourth ends thereof limited and slidably disposed in the guiding grooves, respectively,
   wherein, when each of the fourth ends thereof is situated at one end of the respective guiding groove, the tablet computer is stacked on the surface of the base panel, wherein the touch-controlled display is situated on a surface of the tablet computer opposite to the base panel, and
   when each of the fourth ends thereof is situated at the other end of the respective guiding groove, the tablet computer is stacked on the surface of the base panel, wherein the touch-controlled display is situated on a surface of the tablet computer facing towards the base panel.

2. The portable electronic device according to claim 1, wherein, when each of the fourth ends of the connecting members is situated between at the two opposite ends of the respective guiding groove, the tablet computer stands on the surface of the base panel, thereby forming an included angle between the tablet computer and the base panel.

3. The portable electronic device according to claim 2, wherein the base panel further comprises:
   two prominent strips oppositely arranged on the surface of the base panel; and
   an input interface element disposed on the surface of the base panel, and interposed between the guiding grooves,
   wherein, when the tablet computer stands on the surface of the base panel, one lateral side of the tablet computer physically contacts with both of the prominent strips such that the lateral side of the tablet computer retains a gap with the input interface element.

4. The portable electronic device according to claim 3, wherein the input interface element further comprises a keyboard, a touch-controlled display, a touch-controlled pad or a drag pad.

5. The portable electronic device according to claim 2, wherein the base panel further comprises:
   at least one position limiting groove transversally disposed on one surface of the base panel,
   wherein, when the tablet computer stands on the surface of the base panel, the tablet computer is in the position limiting groove.

6. The portable electronic device according to claim 5, wherein the tablet computer further comprises:
   at least one first magnetic attracting unit disposed on one lateral side of the tablet computer; and
   the base panel further comprises:
   at least one second magnetic attracting unit disposed in the position limiting groove, and aligned to the first magnetic attracting unit,
   wherein, when the tablet computer stands on the surface of the base panel, the first magnetic attracting unit and the second magnetic attracting unit are mutually attracted with each other, such that the tablet computer is fixed in the position limiting groove.

7. The portable electronic device according to claim 6, wherein at least one of the first magnetic attracting unit and the second magnetic attracting unit is an electromagnet, and the electromagnet is capable of being turned off magnetic force thereof.

8. The portable electronic device according to claim 5, wherein the tablet computer further comprises:
   at least one latch groove disposed on one lateral side of the tablet computer; and
   the base panel further comprises:
   at least one convex tooth retractably disposed at an upper edge of the position limiting groove,
   wherein, when the tablet computer stands on the surface of the base panel, the convex tooth is latched into the latch groove, such that the tablet computer is fixed in the position limiting groove.

9. The portable electronic device according to claim 5, wherein the tablet computer further comprises:
   at least one first electrical connector disposed on one surface of the tablet computer opposite to the touch-controlled display and is proximate to one lateral side of the tablet computer; and
   the base panel further comprises:
   at least one second electrical connector disposed at an upper edge of the position limiting groove,
   wherein, when the tablet computer stands on the surface of the base panel, the first electrical connector is connected with the second electrical connector.

10. The portable electronic device according to claim 1, wherein each of the connecting members comprises:
    a rod unit disposed in the groove opening of the guiding groove;
    an upper transversal shaft disposed at one end of the rod unit, disposed outside the groove opening, extended towards one direction, and pivoted to one of the opposite lateral surfaces of the tablet computer; and
    a lower transversal shaft disposed at the other end of the rod unit, extended towards the same direction to which the upper transversal shaft is extended, and limited in the guiding groove, and enabled to reciprocally slide between the two opposite ends of the respective guiding groove.

* * * * *